United States Patent [19]

Page et al.

[11] Patent Number: 5,165,240
[45] Date of Patent: Nov. 24, 1992

[54] METHOD FOR MATCHING ENGINE TORQUES FOR MULTIPLE ENGINE AIRCRAFT

[75] Inventors: George W. Page, Gilbert; Glen T. High; Larry C. Prevallet, both of Phoenix; Joseph W. Free, Mesa, all of Ariz.

[73] Assignee: Allied-Signal Inc., Morris Township, Morris County, N.J.

[21] Appl. No.: 761,606

[22] Filed: Sep. 18, 1991

[51] Int. Cl.[5] .................... G06F 7/70; G06F 15/48
[52] U.S. Cl. .................... 60/719; 364/431.02
[58] Field of Search .................... 60/698, 704, 719; 364/424.01, 424.06, 431.01, 431.02

[56] References Cited

U.S. PATENT DOCUMENTS

| | | |
|---|---|---|
| 4,296,601 | 10/1981 | Martin ................ 364/431.02 X |
| 4,771,427 | 9/1988 | Tulpule et al. |
| 4,785,403 | 11/1988 | Kuhlberg |
| 4,805,396 | 2/1989 | Veerhusen et al. .......... 60/719 |
| 4,947,096 | 8/1990 | Snow |

Primary Examiner—Allen M. Ostrager
Attorney, Agent, or Firm—Hugh P. Gortler; James W. McFarland; Robert A. Walsh

[57] ABSTRACT

Disclosed herein is a method of matching engine torques in a power management system having a digital engine control for each of multiple turbine engines. Input data is selected from one source such that each digital engine control utilizes the same set of input data to generate torque commands. As a result, engine torques can be matched to within one percent.

15 Claims, 3 Drawing Sheets

METHOD FOR MATCHING ENGINE TORQUES FOR MULTIPLE ENGINE AIRCRAFT

FIELD OF THE INVENTION

The present invention relates in general to power management systems for turbine engines and in particular to a method for matching engine torques for multiple engine aircraft.

BACKGROUND OF THE INVENTION

Historically, turboprop engines have been controlled from the cockpit via two levers. A speed lever adjusts engine speed and a power lever adjusts engine torque. To control the engine, a pilot would adjust the speed lever to a desired engine speed setting. Then, the pilot would "close the loop" on torque by watching a gauge and moving the power lever until the desired torque was obtained.

More recently, however, digital engine controls have been employed to adjust engine torques. The digital engine controls issue torque commands, which are based upon ambient conditions including temperature, altitude and mach number, and maintain engine torque at commanded levels via closed loop control.

Torque mismatches can occur when digital engine controls are utilized to manage the power of an aircraft having multiple turboprop engines. Each engine receives torque commands from its own digital engine control, and each digital engine control has its own air data computer for reading ambient conditions. However, the air data computers do not always indicate the same ambient conditions. For example, the air data computer for one engine could read one temperature, while the air data computer for another engine reads a different temperature. Because torque is calculated as a function of data, the two engines would be commanded to different torque levels. The resulting mismatch in torques would cause undesirable yaw.

SUMMARY OF THE INVENTION

The present invention relates to a method of matching engine torques in a system having at least one digital engine control and primary source of data for each of a plurality of turbine engines. Data is selected from one primary source, and the selected data is supplied to generating means of each one of the digital engine controls. In response to the selected data, each generating means generates torque commands. Thus, the digital engine controls all generate torque commands based upon the same set of data. As a result, engine torques can be matched to within one percent.

DETAILED DESCRIPTION OF THE PREFERRED EMBODIMENT

Figure 1:
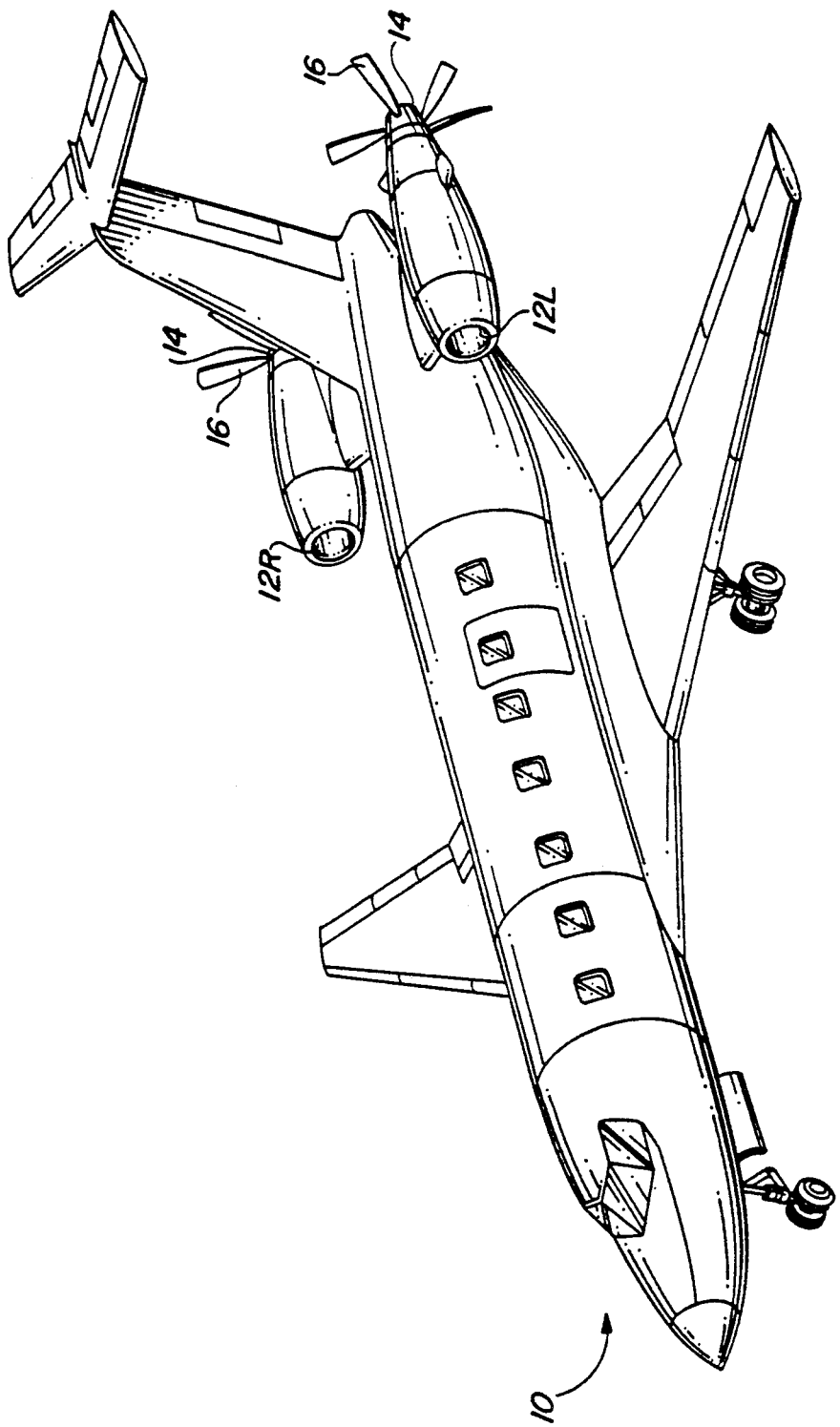
FIG. 1 is a pictorial view of an aircraft having twin turbo prop engines.

Referring to FIG. 1, there is shown an aircraft 10 having left and right turboprop engines 12L and 12R. Each engine 12L and 12R has a turbine-type power plant that includes a compressor section (not shown), combustion section (not shown) and a turbine section (not shown). These sections are arranged in serial flow relation. A spinner 14 is connected to the aft end of each engine 12L and 12R. A plurality of propeller blades 16 are circumferentially disposed about the spinner 14 and extend radially therefrom. Air entering each engine 12L and 12R is compressed in the compressor section. The compressed air is discharged to the combustion section, where the air is mixed with fuel. The mixture is ignited to produce hot expanding gases that turn the turbine section which, in turn, drives the propeller blades 16. The propeller blades 16 move a mass of cold air to create a thrust. The thrust produced by the propeller blades 16 is varied by changing their pitch and speed.

Figure 2:
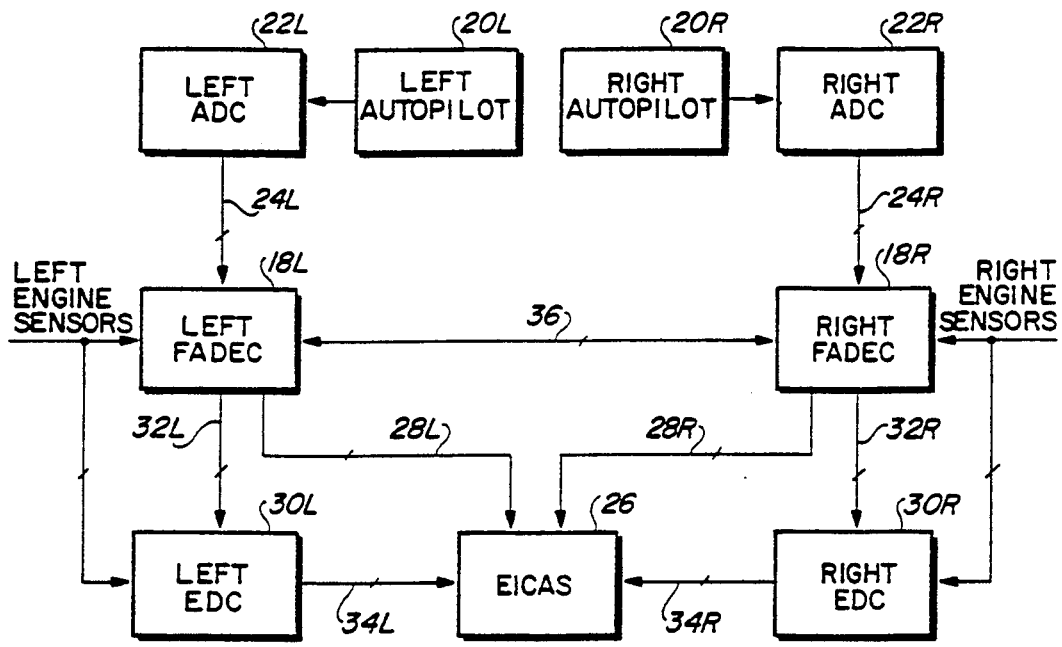
FIG. 2 is a block diagram of avionics architecture for a power management system including left and right FADECS.

FIG. 2 shows a power management system for controlling the aircraft 10. The power management system includes two full authority digital engine controls (FADECS): a left FADEC 18L and a right FADEC 18R. The FADECS 18L and 18R issue speed and fuel flow commands to the left and right engines 12L and 12R, respectively. The fuel flow commands are based upon outside ambient conditions including temperature, altitude and mach number. Disclosed in Applicants' copending application No. 07/762,322 filed concurrently herewith and entitled "POWER MANAGEMENT SYSTEM FOR TURBINE ENGINES" (hereinafter referred to as "Applicants' Power Management System"), is a FADEC including function generators, programmed with torque maps, that provide target torques in response to input signals indicating outside ambient temperature, altitude and mach number. This application is incorporated herein by reference. Although the present invention can be employed with any digital engine control that calculates torques based upon outside ambient conditions, it is especially suitable for the FADEC of Applicants' Power Management System. Accordingly, the present invention will be described in connection with the FADEC of Applicants' Power Management System.

The left FADEC 18L receives input signals from the left engine sensors, which provide engine total pressure (PT2$_L$) as a voltage and engine total temperature (TT2$_L$) as a resistance. The PT2$_L$ and TT2$_L$ data are supplied to the left FADEC 18L at a rate that ensures that changes in ambient conditions will be reflected. The ambient conditions change as fast as the aircraft 10 climbs or descends. Such a rate is 5 Hz. Similarly, right engine sensors provide engine total pressure (PT2$_R$) and engine total temperature (TT2$_R$) to the right FADEC 18R.

A left Autopilot 20L supplies delta torque commands to a left air data computer (ADC) 22L. The delta torque commands are calculated by the left Autopilot 20L to keep the aircraft 10 on a constant glide slope during approach. Similarly, a right Autopilot 20R provides delta torque commands to a right ADC 22R. The left and right Autopilots 20L and 20R can be Collins APC-65G autopilots.

The left ADC 22L determines altitude, outside ambient temperature and mach number for the aircraft 10, and supplies this data to the left FADEC 18L over a first data bus 24L. The left AD 22L also sends the delta torque commands provided by the left Autopilot 20L to the left FADEC 18L over the first data bus 24L. Similarly, the right ADC 22R supplies the right FADEC 18R with altitude, outside ambient temperature, mach number and delta torque commands over a second data bus 24R. The left and right ADCs 22L and 22R can be Collins ADC-86 air data computers. The first and second data buses 24L and 24R can be ARINC-429 data buses. Although other types of data buses can be employed, the ARINC-429 data bus is an industry standard that is defined by commercial airlines.

The left FADEC 18L provides engine parameters (e.g. torque, propeller speed) to an Engine Indication Emergency Crew Alerting System (EICAS) 26 over a third data bus 28L. The left FADEC 18L also provides LRU fault data to the EICAS 26. Such fault data includes gas generator monopole failure and propeller governor failure. The EICAS 26 displays the engine parameters and fault data to the crew and maintenance personnel. Similarly, the right FADEC 18R provides engine parameters and fault data to the EICAS 26 over a fourth data bus 28R. The third and fourth data buses can also be ARINC-429 data buses. The EICAS 26 can be a Collins ED-870 model.

A left Engine Data Concentrator (EDC) 30L receives data from the left engine sensors and the left FADEC 18L. Data is supplied by the left FADEC 18L over a fifth data bus 32L. The data is stored as a redundant set. If necessary, the left EDC 30L sends the redundant set of data to the EICAS 26 over a sixth data bus 34L. Similarly, a right EDC 30R receives data from the right engine sensors and right FADEC 18R via a seventh data bus 32R, and the right EDC 30R outputs data to the EICAS 26 over an eighth data bus 34R. The fifth, sixth, seventh and eight data buses 32L, 34L, 32R and 34R can be ARINC-429 data buses. The left and right EDCs 30L and 30R can be Collins EDCs.

The left and right FADECS 18L and 18R exchange data over a crosstalk bus 36, which can be an RS-422 data bus. Exchanged data includes $PT2_L$, $TT2_L$, $PT2_R$, $TT2_R$, outside ambient temperature, altitude and mach number. Also exchanged are delta torque commands. This exchange allows the left and right FADECS 18L and 18R to use the same set of data for calculating target torques, thereby insuring the same torque loop setpoints and thereby driving each in engine to the same torque in an independent fashion. As a result, torques for the left and right engines 12L and 12R can be matched to within one percent.

Figure 3:
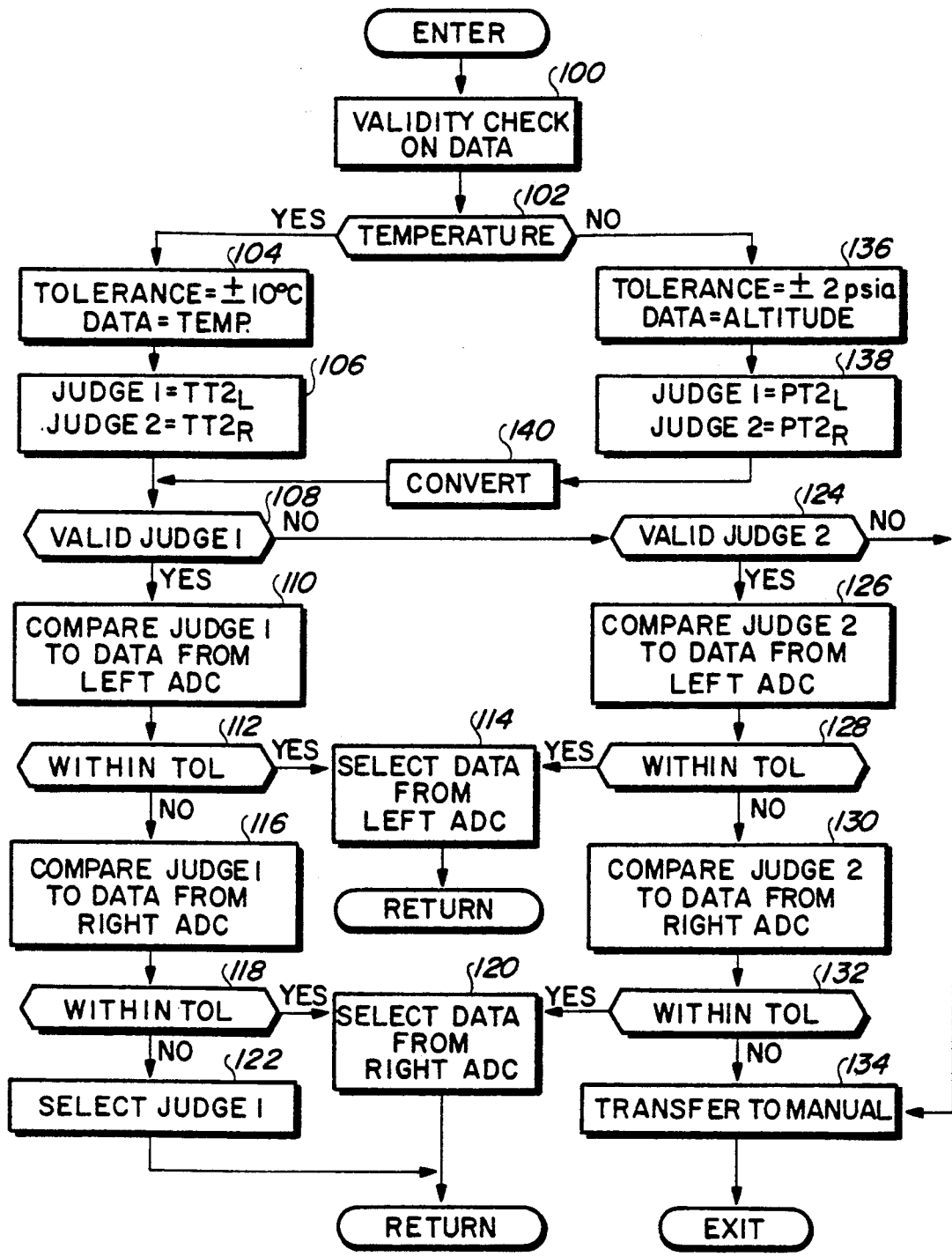
FIG. 3 is a flowchart of a routine for ambient data selection according to the present invention, which routine is executed by the left FADEC.

FIG. 3 is a flowchart for a data selection routine that is executed by the left FADEC 18L. Through this routine, the left FADEC 18L selects altitude and outside ambient temperature data. The left FADEC 18L uses the selected data to generate target torque commands.

The left FADEC 18L selects data according to a hierarchy. First, the left FADEC 18L selects data from the left ADC 22L. However, if that data is not valid, the left FADEC 18L selects data from the right ADC 22R. If, however, the data from the left and right ADCS 22L and 22R is not valid, the left FADEC 18L selects data from its engine sensors. What follows is a detailed description of the data selection routine.

Before selecting temperature and altitude data, the left FADEC 18L performs validity checks on all incoming data (module 100). The left FADEC 18L performs rate and range checks on the $TT2_L$ and $PT2_L$ data. Further, the left FADEC 18L performs rate, range and bus integrity checks on the data supplied from the left ADC 24L and the crosstalk bus 36. These checks are well known to those skilled in the art.

If temperature is to be selected (module 102), the left FADEC 18L initializes parameters for tolerance and data pointer (module 104). The tolerance is initialized to a value such as ±10° C. The data pointer is initialized such that the left FADEC 18L reads temperature data from the left and right ADCS 22L and 22R.

Next, the left FADEC 18L establishes primary and secondary judges JUDGE1 and JUDGE 2 (module 106). $TT2_L$ data is selected as the primary judge, and $TT2_R$ data is selected as the secondary judge.

If the checks indicate that the $TT2_L$ data is valid (module 108), the left FADEC 18L compares the $TT2_L$ data to the outside ambient temperature data provided by the left ADC 22L (module 110). If the outside ambient temperature is within the tolerance of the $TT2_L$ data (module 112), the left FADEC 18L selects the outside ambient temperature provided by the left ADC 22L (module 114). If the temperatures are not within the tolerance, the left FADEC 18L compares the $TT2_L$ data to the outside ambient temperature provided by the right ADC 22R (module 116). If the outside ambient temperature provided by the right ADC 22R is within the tolerance of the $TT2_L$ data (module 118), the left FADEC 18L selects the outside ambient temperature provided by the right ADC 22R (module 120); otherwise, the left FADEC 18L selects the $TT2_L$ data (module 122).

If the $TT2_L$ data is not valid (module 108) and the $TT2_R$ data is valid (module 124), the left FADEC 18L compares the $TT2_R$ data to the temperature data provided by the right ADC 22R (module 126). If the two temperatures compare to within the tolerance (modules 128), the left FADEC 18L selects the outside ambient temperature provided by the left ADC 22L (module 114). If the two temperatures are not within the tolerance (module 128), the left FADEC 18L compares the $TT2_R$ data to the outside ambient temperature provided by the right ADC 22R (module 130). If those two temperatures are within the tolerance of each other (module 132), the left FADEC 18L selects the outside ambient temperature provided by the right ADC 22R (module 120); otherwise, the left FADEC 18L exits auto mode and transfers control to manual mode (module 134).

When both the $TT2_L$ and $TT2_R$ data are not valid (modules 108 and 124), the left FADEC 18L exits auto mode and transfers control to manual mode (module 134).

If altitude is to be selected (module 102), the left FADEC 18L initializes tolerance to a value such as ±2 psia and initializes the data pointer such that the left FADEC 18L reads altitude data from the left and right ADCS 22L and 22R (module 136). Then, the left FADEC 18L establishes $PT2_L$ data as the primary judge and $PT2_R$ data as the secondary judge (module 138).

Figure 4:
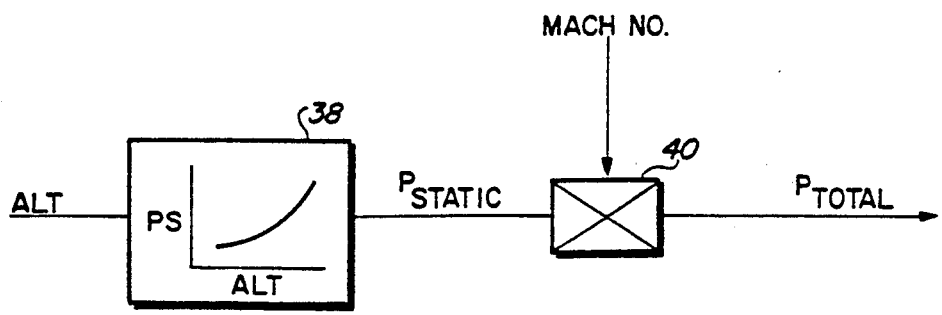
FIG. 4 is a diagram of logic for converting altitude data to pressure data.

The left FADEC 18L converts altitude data provided by the left and right ADCs 22L and 22R to pressure data (module (140), since a direct comparison between the altitude data and the PT2 data cannot be made. As shown in FIG. 4, altitude data is supplied to a function generator 38, which is programmed with a curve of static pressure versus altitude. In response to the altitude data, the function generator 38 provides static pressure data on its output. The static pressure data is corrected for airspeed by a multiplier 40, which multiplies the static pressure by the mach number. An output of the first multiplier 40 provides total pressure data.

If the $PT2_L$ data is valid (module 108) and compares to within the tolerance (i.e., ±2 psia) of the pressure data from the left ADC 22L (modules 110 and 112), the left FADEC 18L selects the altitude data provided by the left ADC 22L (module 114). If the $PT2_L$ data is valid (module 108) but the two pressures are not within the tolerance(module 110 and 112), the left FADEC 18L compares the $PT2_L$ data with the pressure data from the right ADC 22R (module 116). If those two pressures compare to within the tolerance(module 118), the left FADEC 18L selects the altitude provided by the right ADC 22R (module 120); if not, it selects the $PT2_L$ data (module 122).

If the $PT2_L$ data is not valid (module 108) but the $PT2_R$ data is valid (module 124), the left FADEC 18L compares the $PT2_R$ data to the pressure data from the left and right ADCs 22L and 22R (module 126). The left FADEC 18L selects altitude data from the left ADC 22L (module 114) when the pressure data from the left ADC 22L is within the tolerance of the PT2R data (module 128); otherwise, it selects altitude data from the right ADC 22R (module 120) when the pressure data from the right ADC 22R is within the tolerance of the PT2R data (modules 130 and 132). If neither pressure is within the tolerance of the PT2R data, the left FADEC 18L exits auto mode and transfers control to manual mode (module 134).

When both the $PT2_L$ and $PT2_R$ data are not valid (modules 108 and 124), the left FADEC 18L transfers control to manual (module 134).

Range and bus validity checks are also performed on the mach number. If valid, the mach numbers provided by the left and right ADCs 22L and 22R are utilized by the left and right FADECS 18L and 44R, respectively, for target torque calculations. If not valid, the left and right FADECS 18L and 18R use apriori values for mach numbers. For example, mach numbers of 0.2, 0.4 and 0.6 can be used for takeoff, climb and cruise, respectively.

The right FADEC 18R executes the routine shown in FIG. 3 for selecting temperature and altitude except that the right FADEC 18R uses $TT2_R$ and $PT2_R$ data as primary judges and then uses $TT2_L$ and $PT2_L$ data as secondary judges (modules 106 and 138).

A person skilled in the art can readily program the left and right FADECS 18L and 18R with the ambient data selection routines. The data selection routine can be a stand-alone program, or it can be included as a subroutine of a main program.

As previously noted, the ambient data selection routine can be employed in any power management system that utilizes digital engine controls. However, there is a distinct advantage to using the data selection routine with Applicants' Power Management System. Because Applicants' Power Management System rescales the power lever quadrant, matched power lever positions result in matched engine torques. Upon engine installation, the power levers are adjusted to calibrate the FADECS to the aircraft. This insures that each FADEC is reading the same power lever angle for all positions on the power lever quadrant. As a result, the pilot does not have to adjust each lever to prevent a split in engine torques and, therefore, pilot workload is reduced.

It will be understood that the embodiment described herein is merely exemplary and that a person skilled in the art may make many variations and modifications without departing from the spirit and scope of the invention. For example, the ambient data selection routine according to the present invention can be modified for any type of turbine engine. All such modifications are intended to be included within the scope of the invention as defined in the appended claims.

What is claimed is:

1. A method of matching engine torques in a system having a plurality of turbine engines, at least one digital engine control for each turbine engine and at least one primary source of data for each turbine engine, each said digital engine control having generating means, responsive to data on its inputs, for generating torque commands for its corresponding turbine engine, said method comprising the steps of:
   (a) selecting data from one primary source; and
   (b) supplying said selected data on said inputs of each one of said generating means, whereby said digital engine controls all supply torque commands based upon the same set of data.

2. A method according to claim 1, further including the step of establishing a first hierarchy of primary sources before performing step (a); and wherein said step (a) includes the steps of:
   sequencing through said first hierarchy of primary sources until valid data is available; and
   selecting said valid data, whereby said selected valid data is supplied to the inputs of each one of said generator means.

3. A method according to claim 2, wherein said system further includes at least one secondary source of data for each turbine engine, and wherein said step of sequencing includes the steps of:
   establishing data from a secondary source as a judge prior to performing step (a); and
   comparing said data from a primary source in said first hierarchy to said judge, said data from said primary source being valid if within a tolerance of said judge.

4. A method according to claim 3, further including the step of establishing a second hierarchy of secondary sources before performing step (a); wherein said step of establishing said judge includes the steps of sequencing through said second hierarchy of secondary sources until valid secondary data is available; and selecting said valid secondary data as said judge.

5. A method according to claim 4, wherein torque commands are manually supplied to said turbine engines if valid secondary data is not available.

6. A method according to claim 5, wherein said first and second hierarchies are established for each engine, and wherein said steps (a) and (b) are performed for each engine.

7. A method according to claim 6, wherein for each engine, a corresponding secondary source is first in said corresponding second hierarchy.

8. A method according to claim 7, wherein for each engine, secondary data from said corresponding secondary source is selected when said primary data is not valid.

9. A method according to claim 8, wherein for each engine, a corresponding primary source is first in said corresponding first hierarchy.

10. A method according to claim 9, wherein each said primary source provides altitude data, wherein each said secondary source provides pressure data indicative of altitude, and wherein said step of comparing includes the steps of converting said altitude data to pressure data; and comparing said judge to said converted data.

11. A method of matching engine torques in a system having a plurality of turbine engines, at least one digital engine control for each turbine engine, at least one primary source of data for each turbine engine, and at least one secondary source of data for each turbine engine, each said digital engine control having generating means, responsive to data on its inputs, for generating torque commands for its corresponding turbine engine, said method comprising the steps of:
   (a) establishing first and second hierarchies of primary and secondary sources, respectively;
   (b) sequencing through said second hierarchy of secondary sources until valid secondary data is available;
   (c) selecting said valid secondary data as a judge;
   (d) sequencing through said hierarchy of primary sources and comparing said primary data to said judge until valid primary data is available;
   (e) selecting said valid primary data; and
   (f) supplying said selected primary data on said inputs of each one of said generating means, whereby said digital engine controls all supply torque commands based upon the same set of data.

12. A method of matching engine torques in a power management system for an aircraft having first and second turbine engines, said power management system including a first digital engine control, a first air data computer and a first set of engine sensors corresponding to said first engine, said power management system further including a second digital engine control, a second air data computer and a second set of engine sensors corresponding to said second engine, said method for said first digital engine control comprising the steps of:
   (a) sequencing through said first set of engine sensors and then said second set of engine sensors until valid engine sensor data is available;
   (b) selecting said valid engine sensor data as a first judge;
   (c) sequencing through said first air data computer and then said secondary air data computer until said primary data is within a tolerance of said first judge; and
   (d) supplying said primary data from step (c) to inputs of said generating means of said first digital engine control; said method for said second digital engine control comprising the steps of:
   (e) sequencing through said second set of engine sensors and then said first set of engine sensors until valid engine sensor data is available;
   (f) selecting said valid engine sensor data as a second judge;
   (g) sequencing through said first air data computer and then said secondary air data computer until said primary data is within a tolerance of said second judge; and
   (h) supplying said primary data from step (g) to inputs of said generating means of said second digital engine control.

13. A system for commanding engine torques for a plurality of turbine engines, said system including at least one primary source of data for each turbine engine, and at least one digital engine control for each turbine engine, each said digital engine control comprising:
   input means for providing input data, said input means including means for establishing a first hierarchy of primary sources; means for establishing a judge; means for sequencing through said hierarchy of primary sources and comparing said primary data to said judge until valid primary data is available; and means for selecting said valid primary data as said input data; and
   generating means, responsive to said input data, for generating torque commands for its corresponding turbine engine.

14. A system according to claim 13, further including at least one secondary source of data for each turbine engine, wherein said means for establishing a judge for each said digital engine control includes:
   means for establishing a second hierarchy of said secondary sources; and
   means for sequencing through said second hierarchy of secondary sources until valid secondary data is available, wherein said valid secondary data is selected as said judge.

15. A system having first and second turbine engines, a first ADC, first engine sensors and a first FADEC for said first turbine engine, a second ADC, second engine sensors and a second FADEC for said second engine, said first FADEC comprising:
   first means for sequencing through secondary data provided by said first engine sensors and then said second engine sensors until valid secondary data is available, wherein said valid secondary data is selected as a first judge;
   first means for sequencing through primary data provided by said first ADC and then said second ADC and comparing said primary data to said first judge until valid primary data is available, wherein said primary data is valid when said primary data compares to within a tolerance of said first judge; and
   first means, responsive to said valid primary data, for generating torque commands to said first turbine engine;
   said second FADEC comprising:
   second means for sequencing through secondary data provided by said second engine sensors and then said first engine sensors until valid secondary data is available, wherein said valid secondary data is selected as a second judge;
   second means for sequencing through primary data provided by said first ADC and then said second ADC and comparing said primary data to said second judge until valid primary data is valid available, wherein said primary data is valid when said primary data compares to within a tolerance of said second judge; and
   second means, responsive to said valid primary data, for generating torque commands to said second turbine engine.

* * * * *